March 1, 1938. C. S. LAWTON Re. 20,665

METHOD OF AND APPARATUS FOR LAYING SUBMARINE CABLES

Original Filed Feb. 20, 1937 4 Sheets-Sheet 1

INVENTOR
CHESTER S. LAWTON
BY W. F. Presson
ATTORNEY

March 1, 1938. C. S. LAWTON Re. 20,665

METHOD OF AND APPARATUS FOR LAYING SUBMARINE CABLES

Original Filed Feb. 20, 1937 4 Sheets-Sheet 2

INVENTOR
CHESTER S. LAWTON
BY T. F. Presson
ATTORNEY

March 1, 1938. C. S. LAWTON Re. 20,665

METHOD OF AND APPARATUS FOR LAYING SUBMARINE CABLES

Original Filed Feb. 20, 1937 4 Sheets-Sheet 3

INVENTOR
CHESTER S. LAWTON
BY R. A. Presson
ATTORNEY

March 1, 1938. C. S. LAWTON Re. 20,665
METHOD OF AND APPARATUS FOR LAYING SUBMARINE CABLES
Original Filed Feb. 20, 1937 4 Sheets-Sheet 4
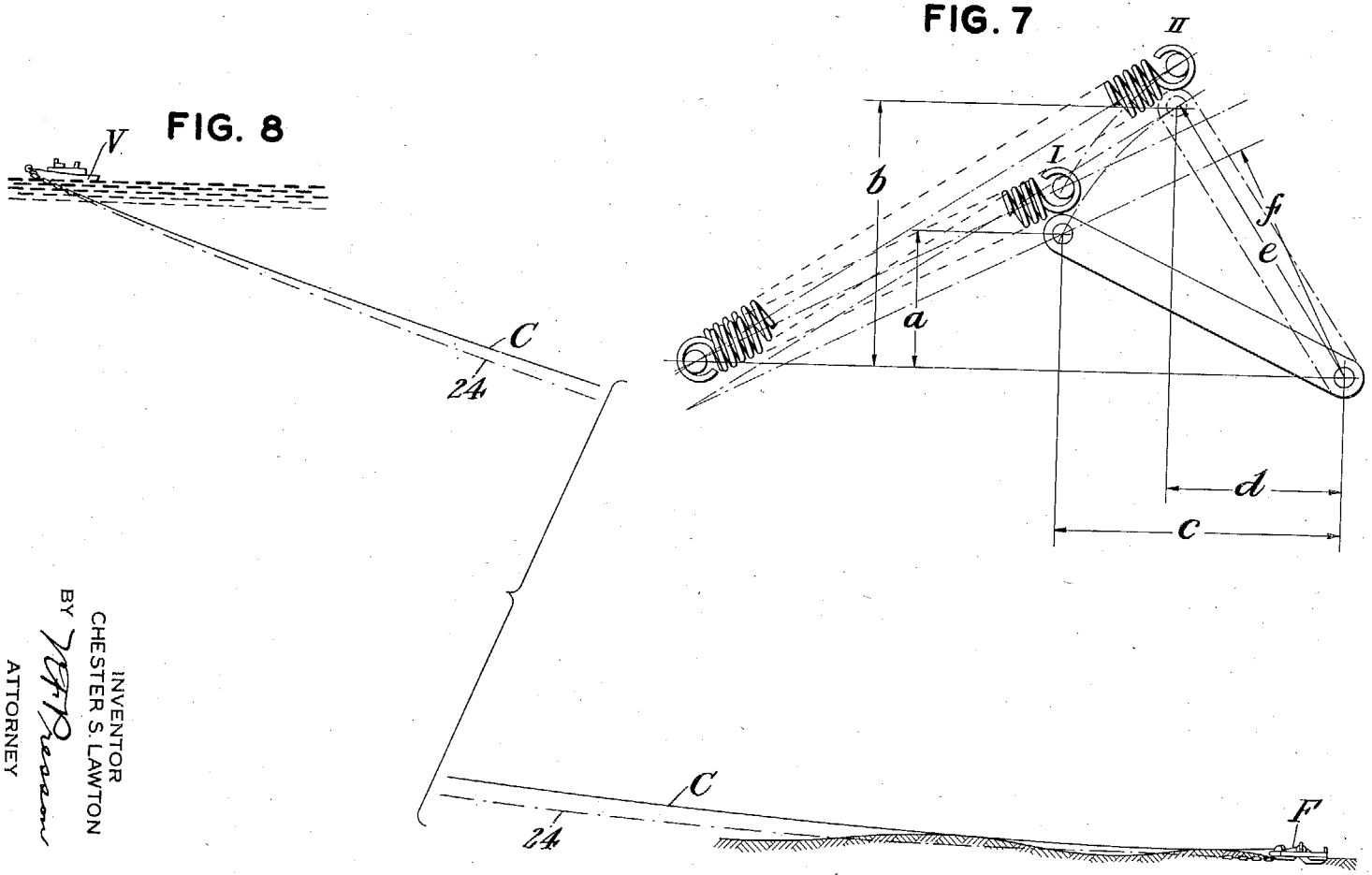
INVENTOR
CHESTER S. LAWTON
BY R. F. Pressau
ATTORNEY Reissued Mar. 1, 1938

Re. 20,665

UNITED STATES PATENT OFFICE 20,665

METHOD OF AND APPARATUS FOR LAYING SUBMARINE CABLES

Chester S. Lawton, Ridgewood, N. J., assignor to The Western Union Telegraph Company, New York, N. Y., a corporation of New York Original No. 2,099,527 dated November 16, 1937, Serial No. 126,926, February 20, 1937. Application for reissue January 19, 1938, Serial No. 185,757

19 Claims. (Cl. 61—72)

The invention relates to a novel method of, and apparatus for, laying a submarine cable in a trench in the bed of the ocean or other body of water.

Submarine cables when laid on the bottom of the ocean or other body of water which they traverse are fouled or dragged frequently and sometimes are broken by otter boards of nets of fishing vessels or by ships' anchors, and in the United States patent to Lawton and Bloomer, No. 2,067,717, issued January 12, 1937, there is disclosed a submarine cable plow for forming under water a trench in the bed of the body of water in which the cable is to lie and simultaneously placing the cable therein to embed the same and thus avoid fouling of, or injury to, the cable. However, in the use of such a plow the ground resistance offered to the passage of the plowshare of the device varies within wide limits depending upon the nature of the bottom, for instance, when passing through the soft deposit which covers certain areas of the ocean bed the ground resistance is comparatively low, and when denser material in other areas is encountered the ground resistance is enormously increased thereby correspondingly increasing the towing tension required to pull the plow. In the latter case there is the possibility of breaking the towline thus causing suspension of operations, and in any event the increased towing tension is liable to cause severe strain on the towline and gear associated therewith and also makes it difficult to properly maneuver the cable ship towing the plow. Also, the depth to which the cable trench can be plowed in soft material is limited by the depth to which the trench can be plowed in the denser material, and thus the cable is not as well protected in the areas of soft material as in the areas of denser material.

One of the objects of the present invention is to obviate the foregoing disadvantages and cause the required towing tension to remain within predetermined reasonable limits, notwithstanding the varying nature of the ocean bed in which the plow is working.

Another object is to cause the depth of the cable trench to be varied as required to maintain the towing tension within certain predetermined limits or to maintain substantially uniform towing tension in ground of varying density.

A further object is to cause the cable to be embedded to a greater depth in those areas of the ocean bed comprising soft material than in the areas comprising denser material, and thus afford uniform protection for the cable.

An additional object is to provide a practical device of the character described which is suitable for embedding submarine cable in deep water and at a considerable distance from shore, and which may be lowered into working position out at sea in such areas.

The invention further resides in the features of combination, construction, and arrangement hereinafter described and claimed.

For an understanding of the invention, and for illustration of one of the forms it may take, reference is had to the accompanying drawings, in which:

Fig. 7 is a diagram illustrating the theory involved in determining the proper values of certain of the elements responsive to the couple set up in the embedding device; and Fig. 8 is a diagrammatic view of a cable ship and the cable embedding device in operation when laying a cable in a trench at the bottom of the ocean or other body of water.

Figure 1:
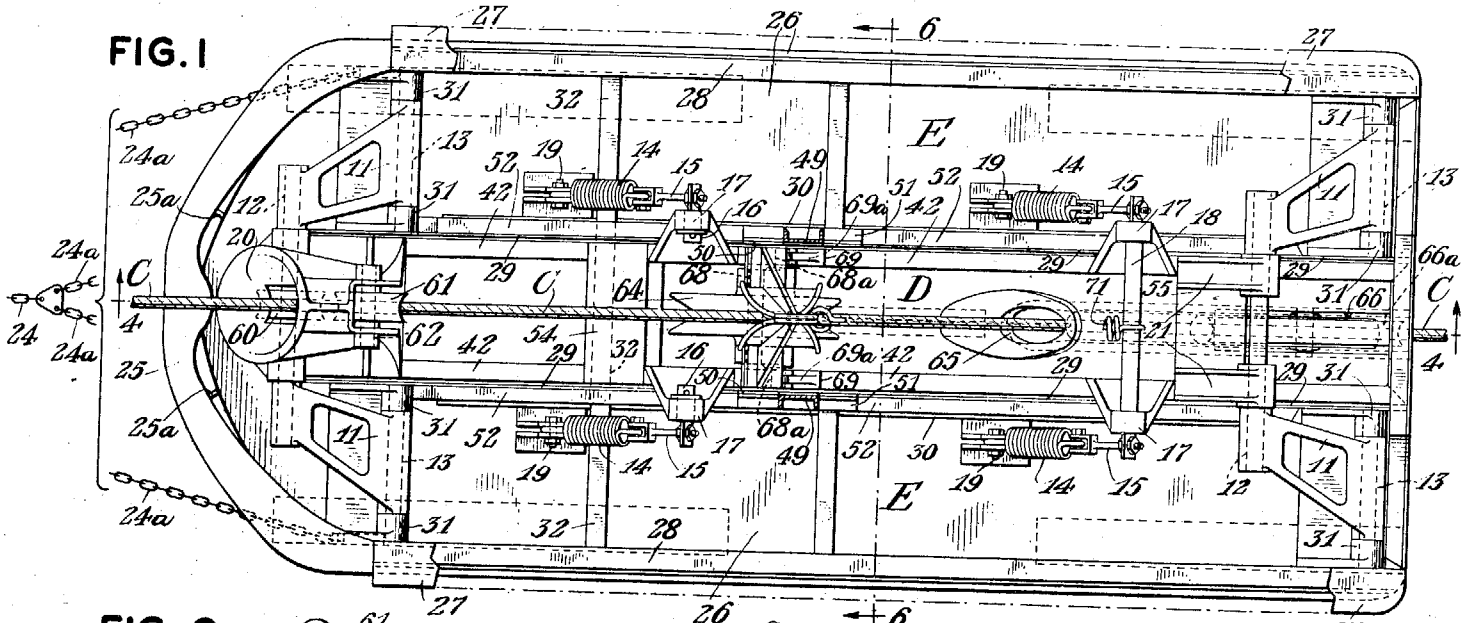
Fig. 1 is a top plan view of one form of a cable laying and embedding device in accordance with the invention.
Figure 2:
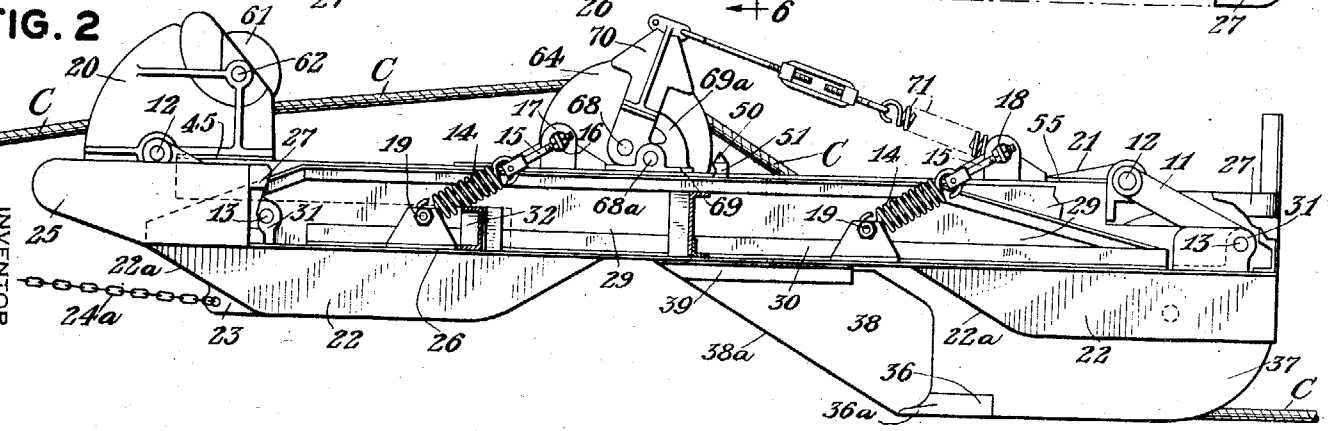
Fig. 2 is a side view, in elevation, of the device of Fig. 1, with certain parts broken away more clearly to disclose other parts.
Figure 3:
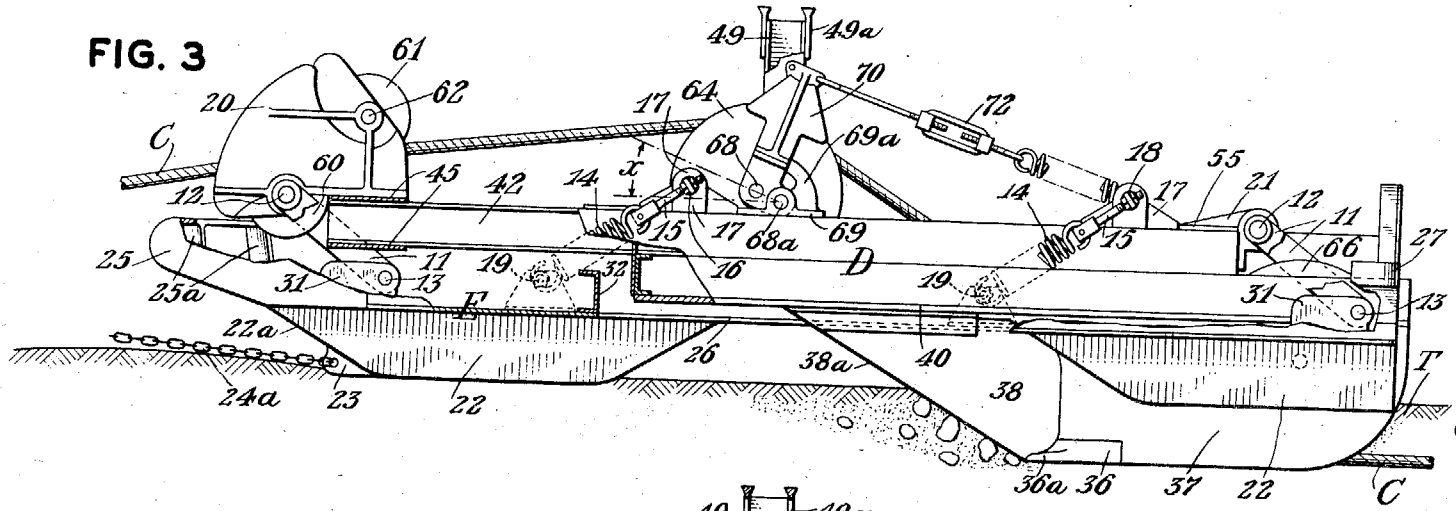
Fig. 3 is a view similar to Fig. 2, showing the plowshare in its operating position when passing through dense material.
Figure 4:
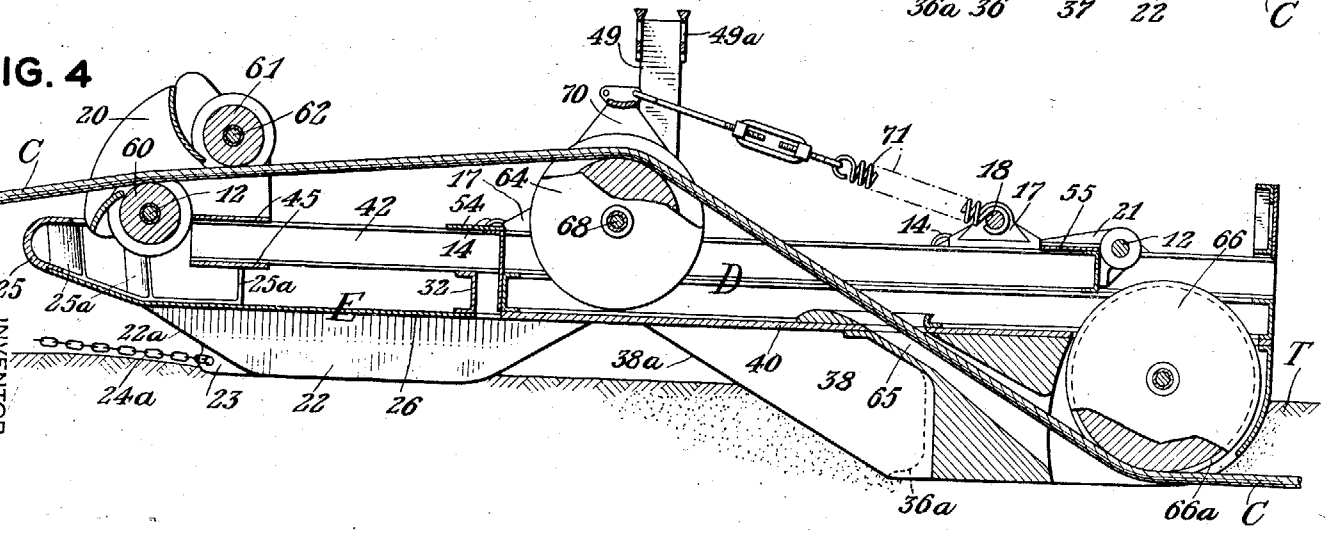
Fig. 4 is a longitudinal section taken along the line 4—4 of Fig. 1, showing the plowshare in its operating position when passing through soft material.

Referring particularly to Figs. 1 to 6 of the drawings, there is shown a cable embedding device for forming a cable trench T, Figs. 3 and 4, and simultaneously placing therein a cable C. The device comprises two coacting frame members or platforms generally designated D and E, respectively, Figs. 3, 4 and 6. For convenience in distinguishing between these two frame members the frame member D is shown by light ink lines and the frame member E is shown by heavy ink lines wherever practicable. The two frame members are interconnected by link structure, for example, four link arms 11, the link arms being pivotally connected by hinge pins 12 and 13 to the frame members D and E to enable the frame D to move vertically relative to frame E. The forward hinge pin 12 is mounted in links 11 and supports frame D by means of bearings 20 mounted thereon, and the after pin 12 is mounted in bearings 21 secured to plate 55 of the frame D. The hinge pins 13 are mounted in bearings 31 secured to the plate 26 of the frame E. As hereinafter set forth in detail, the links 11 operate under certain conditions to cause vertical movement of the frame member D with respect to the frame member E generally in the manner of links joining a pair of parallel rules. The frame members and link structure may be made from iron, steel, brass or other suitable material, preferably material resistant to the corrosive action of salt water.

In its lowermost position, the frame member D rests on the channel iron 32 of the frame E, as shown in Fig. 4, and means are provided to oppose their separation, such as the retractive tension springs 14, Figs. 1 to 3, four of which are employed in the specific embodiment of the invention disclosed herein. The two forward retractive springs 14 are pivotally connected to the frame member D by adjustable bolt members 15 and stub shafts 16 mounted in bearings 17 secured to channel irons 42 of the member D, and the two after springs 14 are similarly connected to the opposite ends of a shaft 18 mounted in bearings 17 secured to the channel irons 42. The opposite ends of the springs 14 are pivotally secured at 19 to the plate 26 of frame member E. Rigidly secured to the frame member D in any suitable manner, as by welding or riveting, and depending therefrom, is a trench forming device such as, for example, a plowshare 36 of wrought or cast steel or other suitable material, for plowing the cable trench in the bed of the body of water. Preferably, and as shown, the plowshare has wing members 36*a* on either side thereof to facilitate displacing the material forming the bed sufficiently to enable the cable to be deposited in the bottom of the resulting trench.

Secured in any suitable manner to the plate 26 of frame member E are means for engaging and traveling along on the bed of the body of water in which the cable C is to lie, these means being shown in the present embodiment as comprising four runners or skid members 22, which members slope upwardly at 22*a* to facilitate sliding of the embedding device over obstacles and irregular surfaces. The runners 22 are the means by which the cable embedding device is slid along on the bottom of the ocean or other body of water, the runners coacting with the plow to determine the depth of the cable trench. Secured to the forward skid members 22 are lugs 23 to which a towline 24 is attached. In the form shown the towline is connected to the lugs 23 by means of a comparatively short loop of chain or bridle 24*a*, Fig. 1.

Figure 5:
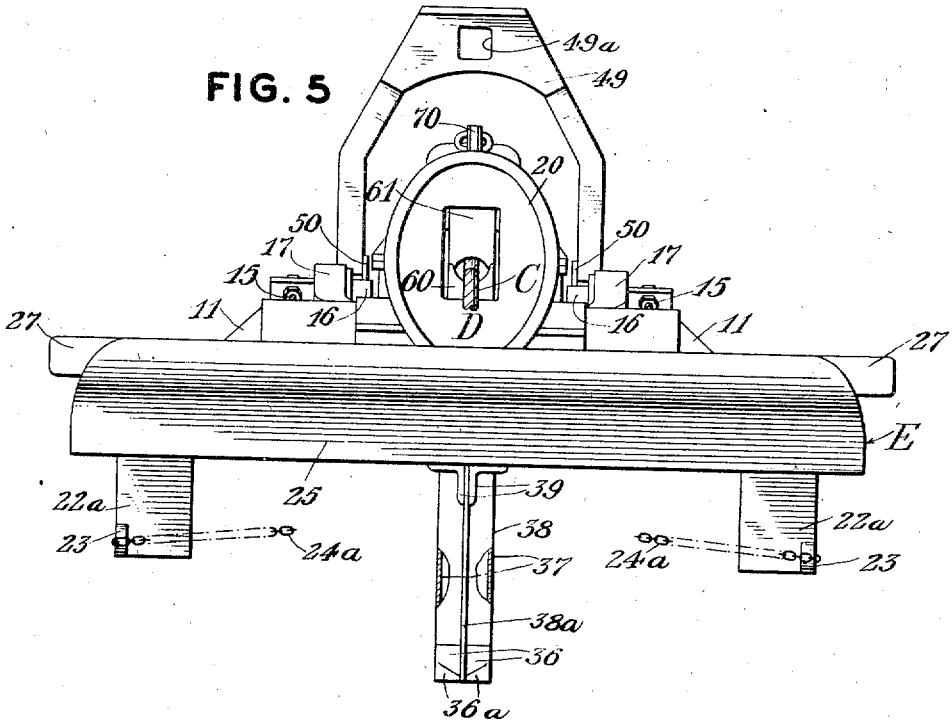
Fig. 5 is a view of the front end of the embedding device.
Figure 6:
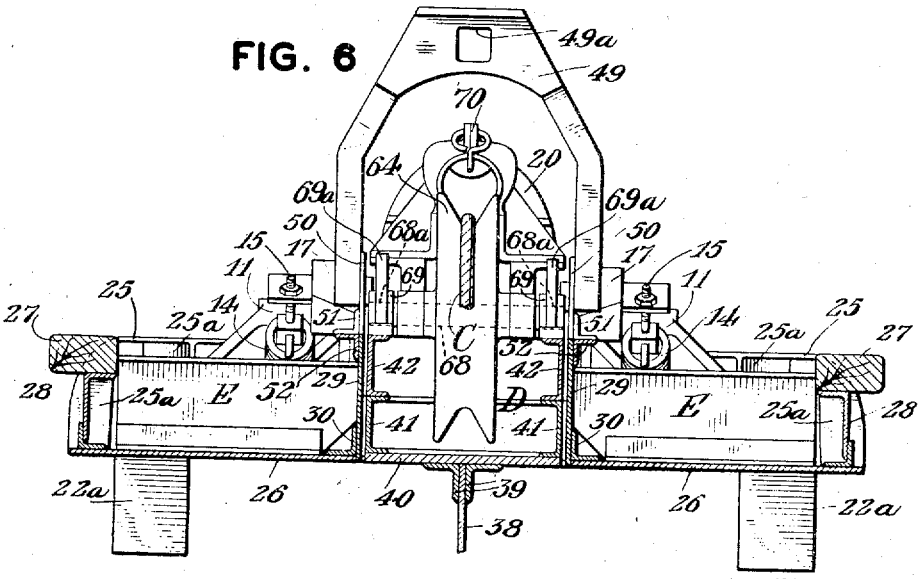
Fig. 6 is a cross-sectional view taken along the line 6—6 of Fig. 1, looking in the direction of the arrows.

A guard member 25 having stiffening ribs 25*a* is secured, as by welding, to the forward end of the platform 26 of the frame E. Side members 27, Figs. 1, 5 and 6, are secured to metal side plate members 28, Fig. 6, so that when the cable embedding device is canted sidewise from the horizontal, due to uneven bed or ground conditions or during lowering operations, these members will prevent the device from turning over. Vertical plate members 29, shown more clearly in Fig. 6, are secured to the platform 26 by angle pieces 30, and serve as guides for the vertical movement of frame member D. In order to prevent fouling of the plowshare 36 by obstructions, such as underlying rock formations and the like, which may be encountered in the ocean bed, a web portion 38 is provided which extends between the plowshare and the plate 40 of the frame D, the inclined forward portion 38*a* of which web engages any such obstruction in advance of the plowshare and causes the latter to be lifted up over the obstruction. After the obstruction has been passed, the device immediately begins again to plow the cable trench and continues with the embedding operation of the cable, and thus operations need not be suspended because of any obstruction encountered.

Secured to the frame D is a cable guide member 20, preferably having the form of a bell mouth, to permit the cable C easily to enter the guide and to reduce friction as the cable passes therethrough to minimize possibility of injury to the cable. The guide member may be secured to the frame D in any suitable manner, as by mounting pieces 45 secured to the channel member 42. Within the bell mouth, and mounted on the forward shaft 12, is a sheave or cable guide roller 60 which coacts with a similar sheave 61 rotatably mounted on a shaft 62 supported by the bell mouth structure, the grooved portions of which sheaves guide the cable through the forward end of the embedding device. After passing over the sheave 60 and under sheave 61 the cable passes over a dynamometer sheave 64, and thence through a trunkway 65, Figs. 1 and 4, so that free passage is afforded the cable into the trench formed by the plow 36, the cable being forcibly laid in the bottom of the trench by means of the sheave or cable guide roller 66 which has a grooved portion 66*a* that receives and guides the cable into the center and lowermost part of the trench T.

The sheave 64 is rotatably mounted on an offset shaft 68, the ends 68*a* of which are mounted in bearings 69 secured to the channel members 42 of the frame D. Integrally secured to the shaft 68 of the sheave supporting structure is a guard member 70 movable with the sheave, the guard member being tensioned by a spring 71 secured at one end to the guard member 70 and at its opposite end to the shaft 18. A turnbuckle 72 is provided to adjust the tension exerted by the spring, which tension urges the guard member 70 against the stop 69*a* secured to the bearing 69. When the cable is under tension, as during the plowing and embedding operation, the tension on the cable tends to rotate the sheave assembly, in a counter-clockwise direction as seen in Figs. 3 and 4, to different positions through the angle $x$ against the action of the spring 71, and this angular movement of the sheave assembly may be employed to give an indication of the amount of tension on the cable at any instant, this feature forming the subject matter of a separately claimed invention not disclosed herein. The limited rotatable movement of the sheave assembly does not affect the operation of the embedding device insofar as the present invention relates, and therefore the sheave 64 may be mounted generally in the manner of sheaves 60, 61 and 66, if desired.

When laying a submarine cable, as will be seen from Fig. 8, the cable embedding device F is towed by a cable ship or vessel V, by means of the towline 24, and the cable C is payed out from the vessel, both the cable and towline forming long curves in the water. By employing a towline of proper length, as may be determined empirically or by calculation, the sag in the line will cause the line to exert a pull on the cable embedding device in a direction substantially parallel to the bed on which the device is traveling, and thus keep the plow 36 at the proper depth in the bed. Preferably, the sag in the cable is maintained such that the cable is approximately tangent to the bed at or near the point where it enters the device F, although this condition may obtain at some distance ahead of the device, as indicated in Fig. 8. The cable is payed out from a cable supply in the hold (not shown) of the vessel V, the cable passing through suitable dynamometer and brake devices on board the cable ship, which devices may comprise those disclosed in the aforesaid Lawton and Bloomer Patent 2,067,717.

The stress on the towline 24 may be measured and controlled within certain limits on board the vessel in any suitable manner, as by a dynamometer device similar to that provided for the cable, thus enabling the length of towline between the bow of the vessel and the cable embedding device F to be adjusted to varying depths of water and conditions of towing.

Referring again to Figs. 3, 4 and 5, after the cable C is deflected downwardly by the trunkway 65, it is caused to be laid into the trench T immediately behind the plow 36, the cable passing between two side plates 37 in order that the material displaced by the plow will not slide or be washed back into the trench before the cable is laid therein. As the cable is laid the trench generally will fill rapidly due to silt deposits and the washing effect of the water, so that the cable becomes covered with the displaced material without the necessity of back filling and in time is firmly embedded in the bed of the body of water.

As stated hereinbefore the ground resistance offered to the passage of the plowshare 36 varies within wide limits depending upon the nature of the bottom, and when dense material is encountered the ground resistance is enormously increased, thereby correspondingly increasing the towing tension required to pull the plow. With the structure of the invention, however, when the ground resistance builds up, a couple is created with the towing tension, tending to separate the two platforms D and E vertically. This causes the upper platform D to rise, as shown in Fig. 3, to different heights depending upon the density of the material forming the bottom, which causes a corresponding rise in the plowshare 36 carried by the platform, thus decreasing the depth of the trench T as the dense material is encountered and causing the trench to vary in depth inversely as the density of the material forming the surface of the bed of the body of water. This automatically reduces the towing tension to a value approximating the tension present when the plow is passing through areas in which the ground resistance of the bed is comparatively low, and therefore the towing tension remains within predetermined reasonable limits, notwithstanding the varying nature of the bed in which the plow is working. Resisting the couple thus formed is the weight of the upper platform D and the tension exerted by the springs 14. By proper design of the spring structure, balance can be obtained at any predetermined maximum towing tension at both extreme positions of the platforms. The balance may vary slightly in between these limits, but can easily be such that a proper length of lever arm 11 may be employed to avoid an unreasonable amount of angular motion. This angular motion will cause one of the platforms to move horizontally a slight distance with respect to the other, which movement, however, has no detrimental effect upon the operation of the device.

With a given weight of the platform D, and a given maximum allowable ground resistance (which will approximate the maximum allowable towing tension at the plow, the difference being absorbed in runner friction), one method of computing the necessary initial spring tension and the maximum spring tension, in order to create the desired couple, is diagrammatically illustrated in Figure 7 of the drawings. For convenience, the lower end of the spring is assumed to be pivoted on the same horizontal line as the lower end of the lever arm, although this condition is not necessary. Now assume the two extreme positions of the arm and spring to be as shown at I and II.

Let W=weight of upper platform
R=maximum allowable ground resistance
$s$=initial spring tension (at I)
S=maximum spring tension (at II)

| | At I | At II |
|---|---|---|
| Couple tending to separate platforms | $Ra$ | $Rb$ |
| Moment opposing separation | $Wc+sf$ | $Wd+Se$ |
| For equilibrium | $Ra=Wc+sf$ | $Rb=Wd+Se$ |

Since $s$ and S are the only unknowns, they are easily obtained. When the plow is resting on the ground with the share out of the ground, in order for the maximum bearing pressure to be applied to the point of the share, care must be taken to so design the plow that the initial spring tension will be sufficient to overcome the tendency of the lower platform to settle onto the ground. It will be understood that the foregoing values may also be determined empirically.

When laying cable in water of any considerable depth it is generally essential that armored cable be used owing to the necessity of imparting to the cable sufficient tensile strength to withstand its own weight in suspension as well as the friction in passing through the cable embedding device. Therefore, if the cable is caused to make acute bends or angles either where it enters or as it is passed through the embedding device, this will kink the cable and prevent its being properly laid in the trench, or if laid in the trench, the armor wires of the cable would develop a permanent set tending to produce kinks which would prevent it from lying flat in the trench and cause portions of it to extend out of the trench. Also, making any acute bend or angle in the cable tends to cause electrical damage as well as mechanical damage. As shown in Fig. 4, the cable is caused to pass through the device from the forward to the after end thereof, and is positively guided in its course by the respective guide members 60, 61, 64 and 66 shown. Due to the appreciable length of the plow and the fact that the cable enters at the extreme forward end and leaves at the extreme after end, there is a gradual transition in the direction of the cable as it enters the plow and is laid into the trench. Elimination of short bends in the cable as it passes through the embedding device also materially reduces the friction or pull of the plow on the cable and thus tends to prevent abrasion and rupture of the cable or the introduction of severe strains in the cable. It also appreciably reduces the towline pull necessarily exerted by the ship while the cable is being laid. The angles of deflection of the cable will, of course, vary within certain limits depending upon the depth of the cable trench, the length of the plow, the size of the cable, etc. Preferably, the cable is not deflected through an angle greater than approximately thirty degrees as it passes through the embedding device, although if guide elements having suitably large radii are employed, it is conceivable that the cable might safely be deflected through angles up to sixty degrees.

By proper adjustment of the link and spring structures employed, taking into consideration the weight of the platform D, the towing tension may be maintained substantially uniform in ground of varying density. This arrangement enables the plow to be adjusted so as to dig a deeper trench when in soft material than would ordinarily be the case since, if the plow were not automatically adjustable to different positions, the depth to which the plow could operate in soft material could not substantially exceed that in which it could operate in the dense material encountered, and thus with the arrangement of the invention, uniform protection is afforded to the cable because it is buried deeper in the areas of soft material, where the hazards of being fouled are greater, than in areas of denser material where the hazards of being fouled are not so great.

Owing to the unusually long lengths of towline which have to be handled in using a submarine cable plow the method commonly employed by fishing vessels and others in handling lines of this description on large storage reels is impracticable. Therefore, as shown in Figs. 9 and 10 of the Lawton et al. Patent 2,067,717, it is necessary to handle the towline over the ship's cable gear and drums which provide merely the frictional grip due to several turns of line around a cylindrical surface. After the completion of a plowing operation it becomes necessary to retrieve the plow. This can only be done by raising it on the towline, the line being heaved in board, and as it comes off the drum is passed to a storage tank where it is coiled down flat. In an attempt to avoid kinking of a rope towline, a free-acting swivel directly ahead of the plow is employed, but when the plow is lifted clear of the bottom in the process of recovery the lay of the strands in the rope becomes elongated under tension until a condition of torsional equilibrium obtains. Although ropes are constructed with the individual wires in the strands laid up in the opposite direction from the lay of the strands themselves in the rope, nevertheless perfect torsional balance is never obtained. A degree of torsional balance which is quite satisfactory for most industrial applications has been found unsatisfactory in the present case.

In hoisting the plow the tow rope is brought in over the bow of the ship and over the cable drums under tension in the above described condition of elongated lay and torsional equilibrium. As the rope comes off the cable drum and the tension is thereby relieved, due to its springy characteristic, the rope tends to try to twist itself up again until it has resumed its normal lay in slack condition. However, as the bitter end of the rope is at the bottom of a flat coil lying in the ship's storage tank, that portion of the rope between the cable drum and the tank is not free to twist without forming twisted bights in which condition it can not again be payed out. Also, during certain maneuvers of the cable ship, and under storm conditions, it may happen that a considerable amount of slack is introduced in the towline 25, which slack accumulates on the bed of the ocean ahead of the embedding device. With the towline heretofore employed, which comprised a wire rope, torsional forces are developed, as stated above, due to the spiral construction of the rope, and these forces frequently cause loops to form in the towline during the times when slack is introduced therein, and when the tension is again exerted on the tow line kinks are introduced into the line and cause injury thereto. To obviate the foregoing disadvantages, the towline 24 preferably comprises a steel chain, for example, a stud link chain, of high strength: weight ratio, in which there is no spiral lay and which is therefore free from torsional forces, so that substantially no kinking or twisting of the towline occurs.

The embedding device may be lowered onto the bed of the ocean or other body of water by any suitable form of lowering line, and to facilitate this there is provided a lowering attachment 49 having a lifting eye 49a, the attachment being secured to vertical plate members 50 which in turn are secured by angle pieces 51 and 52 to the vertical pieces 29 of the frame E. One manner of lowering the embedding device is shown in the aforesaid Lawton and Bloomer patent, although any other suitable method of lowering may be employed.

Because of the disposition of the center of gravity which is kept low in the device, and because of the substantial breadth of the device and the members 27 and 28, it will not turn over even though canted through a large angle with respect to the horizontal and if the device should be canted onto its side, its configuration and its low center of gravity will tend to cause it to return to working position.

As hereinbefore stated, the cable embedding device is particularly suitable for submarine work, and is especially adapted for embedding submarine cable in deep water and at a considerable distance from shore, and may be lowered into working position out at sea in such areas. The device is also well adapted for embedding underground cables on shore or land, particularly in soft or marshy land where trench digging and cable laying devices of the types heretofore employed are unsuitable.

While there is shown and described herein a preferred embodiment of the invention, many other and varied forms and uses will suggest themselves to those versed in the art without departing from the invention, and the invention is, therefore, not limited except as indicated by the scope of the appended claims.

What is claimed is:

1. The method of laying a submarine cable which comprises plowing under water a trench in the bed of the body of water in which the cable is to lie, varying the depth of the trench in accordance with the ground resistance offered to the passage of the plow, and simultaneously paying out the cable toward the trench and placing it in the trench as the latter is plowed.

2. The method of laying a submarine cable, which comprises forming under water a trench in the bed of the body of water in which the cable is to lie, causing said trench to vary in depth inversely as the density of the material forming the surface of the bed, and simultaneously paying out the cable toward said trench and placing it in the trench as the latter is formed.

3. In the art of laying a submarine cable in the bed of a body of water by passing the cable through a trench-forming plow towed by a vessel, the method of causing the towing tension to remain within predetermined limits notwithstanding the varying nature of the bed in which the plow is working, which comprises causing the depth of the cable trench to vary in accordance with the towing tension.

4. The method of embedding a submarine cable, which comprises towing a device for forming under water a trench in the bed of the body of water in which the cable is to lie, causing the trench formed thereby to vary in depth as required to maintain the towing tension within predetermined limits, and simultaneously paying out the cable toward the trench and placing it in the trench as the latter is formed.

5. The method of laying a submarine cable in the bed of a body of water, which comprises forming a trench and placing the cable in the trench, and causing the cable to be buried deeper in those areas of the bed where the ground resistance is relatively low than in those areas of the bed where the ground resistance is relatively high.

6. A submarine cable embedding device comprising trench forming means for forming under water a trench in the bed of the body of water in which the cable is to lie, said device having supporting means for traveling along on the bed of said body of water, and means operable in accordance with the ground resistance offered to the passage of said trench forming means through the bed for adjusting the position of the trench forming means relative to the supporting means to vary the depth of the trench as said ground resistance varies.

7. A submarine cable embedding device comprising trench forming means for forming under water a trench in the bed of the body of water in which the cable is to lie, said device having supporting means for traveling along on the bed of said body of water, means operable in accordance with the ground resistance offered to the passage of said trench forming means through the bed for adjusting the position of the trench forming means relative to the supporting means to vary the depth of the trench as said ground resistance varies, and cable guide means for directing the cable through the embedding device and forcibly placing the cable in the trench immediately behind said trench forming means.

8. A submarine cable embedding device comprising trench forming means for forming under water a trench in the bed of the body of water in which the cable is to lie, means on said device to enable the same to travel along on the bed of said body of water, means for towing the device along on said bed, and means operable in accordance with the towing tension for vertically adjusting the position of the trench forming means to vary the depth of the trench as the towing tension varies.

9. A submarine cable embedding device comprising a supporting structure having means for engaging and traveling along on the bed of the body of water in which the cable is to lie, a trench forming device carried by said structure and adjustable to different positions to form a trench of varying depth, and means operable in accordance with the ground resistance offered to the passage of said trench forming device for adjusting the position of the same to cause the trench to vary in depth inversely as said ground resistance varies.

10. A submarine cable embedding device comprising a supporting structure having means for engaging and traveling along on the bed of the body of water in which the cable is to lie, a trench forming device carried by said supporting structure and vertically adjustable to different positions relative thereto to form a trench of varying depth, and means controlled by the ground resistance offered to the passage of said trench forming device for vertically adjusting the position of the same relative to the supporting structure to cause the depth of the trench to increase and decrease as said ground resistance decreases and increases, respectively.

11. A submarine cable embedding device comprising a first frame member and a second frame member and means interconnecting said members for enabling movement of the second member relative to the first member, said first frame member having supporting means for engaging and traveling along on the bed of the body of water in which the cable is to lie, said second frame member having a device for forming a cable trench in said bed, and means operable in accordance with the ground resistance offered to the passage of the trench-forming device for moving said second frame member relative to the first frame member for adjusting the position of the trench forming device to vary the depth of the trench as said ground resistance varies.

12. A submarine cable embedding device comprising a first frame member and a second frame member and means interconnecting said frame members for enabling relative vertical movement between them, said first frame member having supporting means for engaging and traveling along on the bed of the body of water in which the cable is to lie, said second frame member having a device for forming a cable trench in said bed, and means operable in accordance with the ground resistance offered to the passage of the trench-forming device for vertically moving said second frame member relative to the first frame member for adjusting the position of the trench-forming device to vary the depth of the trench as said ground resistance varies, and cable guide means for directing the cable through the embedding device and forcibly placing the cable in the trench immediately behind said trench-forming device.

13. A submarine cable embedding device comprising a first frame member, a second frame member having a plowshare for plowing a cable trench in the bed of the body of water in which the cable is to lie, and means interconnecting said frame members for enabling relative vertical movement between them, said first frame member having means for engaging and traveling along on the bed of the body of water, and means controlled by the ground resistance offered to the passage of said plowshare for vertically moving said second frame member relative to the first frame member for automatically adjusting the position of the plowshare to vary the depth of the trench as said ground resistance varies.

14. A submarine cable embedding device comprising a first frame member, a second frame member having a plowshare for plowing a cable trench in the bed of the body of water in which the cable is to lie, and means interconnecting said frame members for enabling relative movement between them, said first frame member having means for engaging and traveling along on the bed of the body of water, means controlled by the ground resistance offered to the passage of said plowshare for vertically moving said second frame member relative to the first frame member for adjusting the position of the plowshare to vary the depth of the trench in accordance with said ground resistance, and means positioned adjacent to and in advance of the plowshare and movable therewith for engaging obstructions beneath the surface of said bed and lifting the plowshare over said obstructions.

15. A submarine cable embedding device comprising a first frame member and a second frame member and means interconnecting said frame members responsive to a couple set up therein, means urging one of said frame members towards the other, said first frame member having means for engaging and traveling along on the bed of the body of water in which the cable is to lie said second frame member having a device for forming a cable trench in said bed, and means operable by the ground resistance offered to the passage of the trench-forming device for vertically moving said second frame member away from the first frame member, against the action of said means urging one of the frame members towards the other, for adjusting the position of the trench-forming device to decrease the depth of the trench as said ground resistance increases.

16. A submarine cable embedding device comprising a first frame member and a second frame member and means pivotally connecting said frame members responsive to a couple set up therein, resilient means urging one of said frame members towards the other, said first frame member having means for engaging and traveling along on the bed of the body of water in which the cable is to lie, said second frame member having a device for forming a cable trench in said bed, and means controlled by the ground resistance offered to the passage of the trench-forming device for vertically moving said second frame member away from the first frame member, against the action of said resilient means urging one of the frame members towards the other, for adjusting the position of the trench-forming device to decrease the depth of the trench as said ground resistance increases.

17. A submarine cable embedding device comprising a first frame member, a second frame member, and link members connecting said frame members and responsive to a couple set up therein, resilient means urging one of said frame members towards the other, said first frame member having means for engaging and traveling along on the bed of the body of water in which the cable is to lie, said second frame member having a device for forming a cable trench in said bed, and means controlled by the ground resistance offered to the passage of the trench-forming device for vertically moving said second frame member relative to the first frame member, against the action of said resilient means urging one of the frame members towards the other, for adjusting the position of the trench forming device to decrease the depth of the trench as said ground resistance increases.

18. Apparatus for laying submarine cable, comprising an embedding device through which the cable passes, means on said device to enable the same to travel along on the bed of the body of water in which the cable is to lie, means carried by said device for plowing a cable trench in said bed, cable guide structure for directing the cable through the embedding device from the forward to the after end thereof and for placing the cable in the trench, a vessel for towing the embedding device, and a towline of non-spiral construction extending between said vessel and the embedding device and free from torsional forces tending to twist or kink the same.

19. Apparatus for laying submarine cable, comprising an embedding device through which the cable passes, means on said device to enable the same to travel along on the bed of the body of water in which the cable is to lie, means carried by said device for plowing a cable trench in said bed, cable guide structure for directing the cable through the embedding device from the forward to the after end thereof and for placing the cable in the trench, a vessel for towing the embedding device, and a towline comprising a stud link chain of non-spiral construction extending between said vessel and the embedding device and free from torsional forces tending to twist or kink the same.

CHESTER S. LAWTON.